(12) United States Patent
Coulter et al.

(10) Patent No.: US 6,304,638 B1
(45) Date of Patent: *Oct. 16, 2001

(54) COUPLER FOR A COMMUNICATIONS DEVICE

(75) Inventors: Richard L. Coulter, Los Altos; Scott F. Fullam, Mountain View, both of CA (US)

(73) Assignee: PocketMail Inc., Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,156

(22) Filed: Feb. 11, 2000

Related U.S. Application Data

(63) Continuation-in-part of application No. 09/203,300, filed on Dec. 1, 1998, now Pat. No. 5,995,599.
(60) Provisional application No. 60/172,854, filed on Dec. 10, 1999, provisional application No. 60/119,920, filed on Mar. 15, 1999, and provisional application No. 60/095,732, filed on Aug. 7, 1998.

(51) Int. Cl.⁷ .................................................. H04M 11/00
(52) U.S. Cl. ........................................ 379/93.37; 379/444
(58) Field of Search ................................. 379/93.37, 52, 379/110.01, 442–444

(56) References Cited

U.S. PATENT DOCUMENTS

| 4,268,721 | 5/1981 | Nielson et al. ................... 179/2 C |
| 4,897,732 | 1/1990 | Kinoshita et al. ................. 358/335 |
| 5,995,599 | * 11/1999 | Dunn et al. ..................... 379/93.37 |

FOREIGN PATENT DOCUMENTS

| 2 180 721 | 4/1987 | (GB) . |
| 57-93758 | 6/1982 | (JP) . |

* cited by examiner

Primary Examiner—Wing F. Chan
(74) Attorney, Agent, or Firm—Townsend and Townsend and Crew LLP

(57) ABSTRACT

A coupler enabling communication of information between a communication device, such as a PIM device, and an acoustic device, such as a telephone, using acoustic tones. The coupler includes a speaker for transmitting information in the form of acoustic tones to the acoustic device and a speaker for receiving acoustic tones from the acoustic device. The coupler may also include an adjustment mechanism which facilitates coupling between the microphone and an earpiece of the acoustic device and between the speaker and a mouthpiece of the acoustic device. The microphone and speaker positions may be adjustable to adapt to a variety of telephone handset styles, such as cellular telephones or cordless telephones.

22 Claims, 13 Drawing Sheets

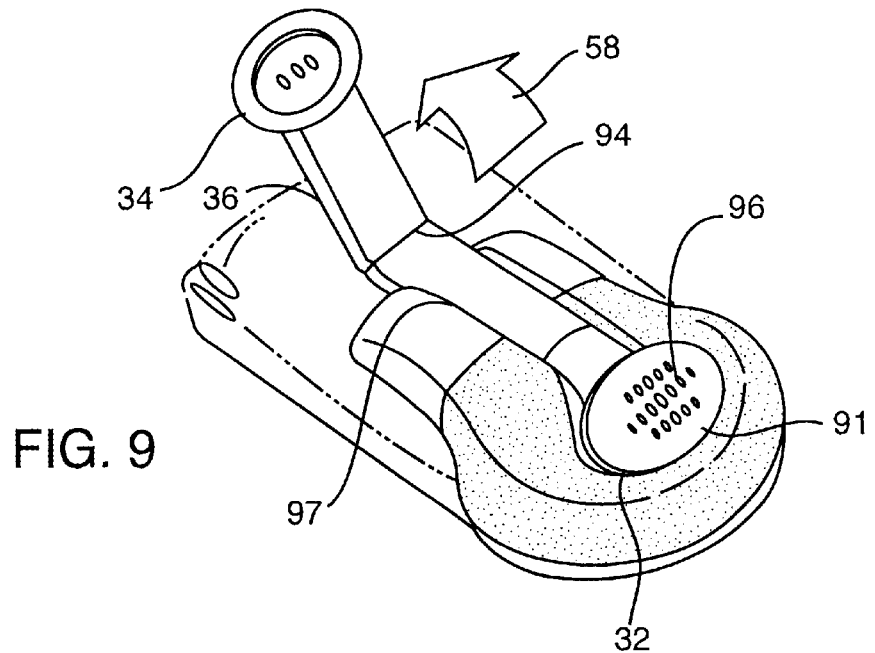
FIG. 9
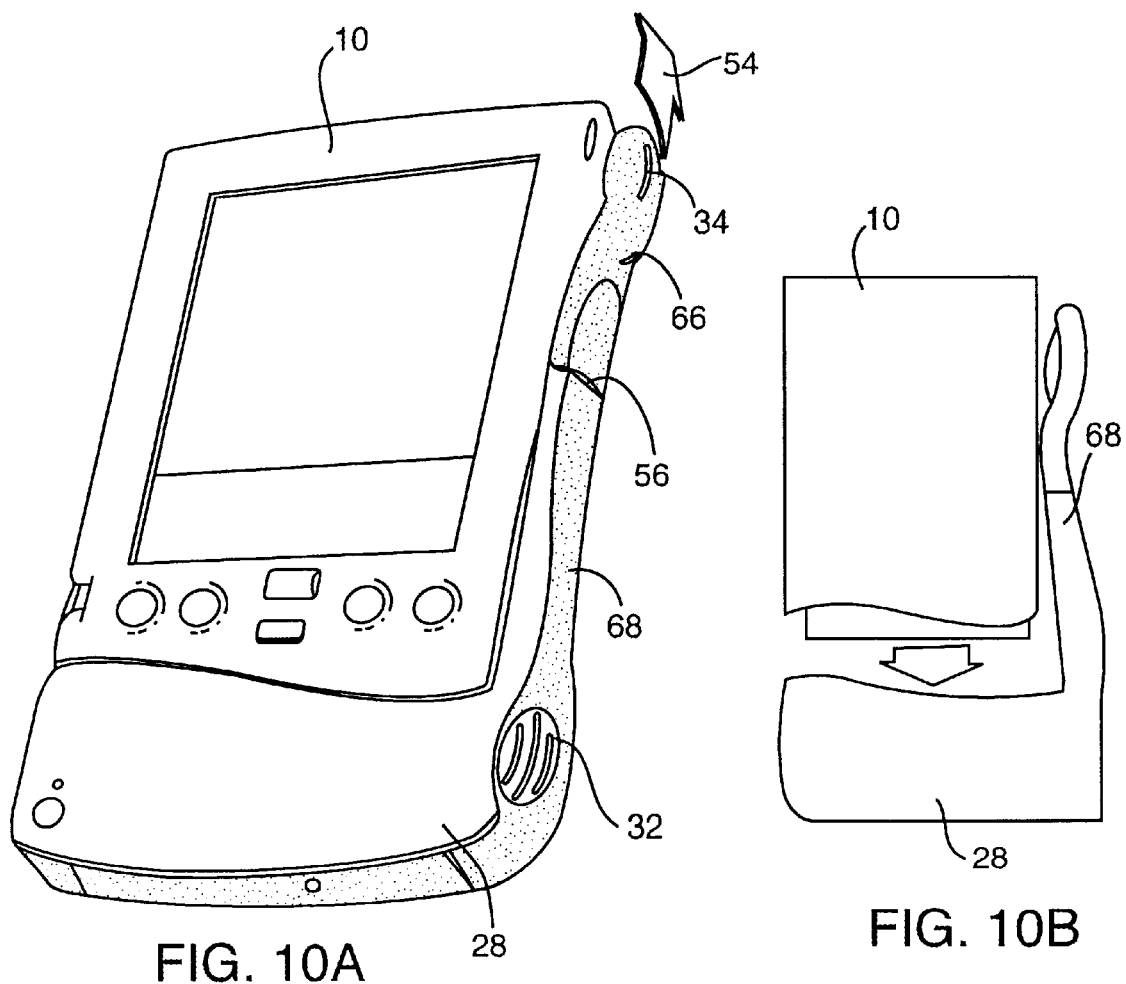
FIG. 10A
FIG. 10B

COUPLER FOR A COMMUNICATIONS DEVICE

This application is a Continuation-in-Part of U.S. Non-Provisional application Ser. No. 09/203,300, filed Dec. 1, 1998, U.S. Pat. No. 5,995,599, which claims the benefit and priority of U.S. Provisional Application No. 60/095,732, filed Aug. 7, 1998. This application also claims the benefit and priority of U.S. Provisional Application No. 60/119,920, filed Mar. 15, 1999, and U.S. Provisional Application No. 60/172,854, filed Dec. 10, 1999. Each of the above references and applications is herein incorporated by reference for all purposes.

BACKGROUND OF THE INVENTION

The present invention relates generally to acoustically coupled information devices, and in particular, to a coupler enabling communication of information between a communication device and an acoustic device, such as a telephone, using acoustic tones.

Several types of devices including data processors and/or microcomputers are now being used to manage personal information such as contact information, addresses, telephone information, calendar information, appointments, expenses, mapping information, and the like. These devices, sometimes referred to as personal information management (PIM) devices, are also being equipped with telecommunication capabilities which enable the PIM devices to provide the combined functions of a personal information manager with those of a telephone, pager, fax machine, or other telecommunications device. Using these telecommunication capabilities, PIM devices may be used to remotely download or upload information from a communication network such as the Internet or from any other data management system, such as an electronic mail (E-mail) system, a mail server, and the like.

FIG. 1 depicts a simplified illustration of in exemplary handheld PIM device 10 described above. As shown, handheld device 10 may include a housing 22 having various function buttons 16 and a display screen 12. Function buttons 16 may permit a user to input data/information into handheld device 10, to display information on screen 12, or to perform other data processing/management functions. Display screen 12 is generally used to output information to the user and in one embodiment may be a liquid crystal display (LCD). Display screen 12 may also display various functional icons 14. By touching display screen 12 over the displayed icons 14, handheld device 10 can be made to perform functions including functions which may be performed using function buttons 16. Examples of PIM devices like the one depicted in FIG. 1 include the Palm™ family of devices available from 3Com™ Corporation.

PIM devices such as device 10 depicted in FIG. 1, or other communication devices generally upload/download information from other information sources via one or more communication links established between the PIM device and the information source. Examples of communication links include hardwire links, optical links, satellite or other wireless communications links, wave propagation links, or any other mechanisms for communication of information. Examples of information sources include a personal computer (PC), a fax machine, a communication network such as the Internet, and the like. Information which may be uploaded/downloaded by a PIM device or a communication device includes personal information, web pages, E-mail messages, electronic faxes, graphics, audio information, video information, and the like. For example, device 10 illustrated in FIG. 1 may use electronic access port 20 having contacts 18 to establish a communication link with other devices for uploading/downloading information.

Some PIM devices are also capable of uploading/downloading information using an acoustical link between the PIM device and the information source. These PIM devices are typically equipped with a microphone and/or speaker assembly integrated into the handheld PIM device. The microphone and/or speaker allow the PIM device to establishment an acoustical communication link with the information source. These types of PIM systems are highly advantageous since they permit the handheld device to be acoustically coupled to a variety of different acoustic devices which transmit information using acoustic tones.

In order for a device to communicate information with an acoustic device, such as a telephone handset, it is necessary to acoustically couple the mouthpiece and earpiece of the acoustic device to a speaker and a microphone, respectively, which may typically be integrated with the device. A good acoustic coupling is required to ensure reliable transmission and reception of acoustical information signals/tones. Conventional coupling devices typically use large cups which enclose the entire mouthpiece and earpiece of a telephone handset in order to acoustically couple the speaker and the microphone to the telephone handset.

Although these coupling mechanisms provide good coupling, they are generally quite large and unwieldy and add weight and size to an otherwise light-weight, handheld, portable device. The increased weight and size also makes the integrated devices unattractive to users. Accordingly, although consumers desire the features offered by acoustical coupling, they are unwilling to use devices which are not convenient to be used as portable PIM devices.

Further, conventional coupling mechanisms are primarily designed to be connected to a typical standard telephone handset, such as those used for pay telephones, and cannot be easily adjusted to work with other types of telephone handsets, such as cellular telephones or cordless phones. Some conventional acoustical couplers provide some degree of adjustability of the large plastic cups, but even these adjustable acoustical couplers cannot accommodate cellular telephones or cordless telephones due to the odd shape and positioning of the mouthpiece and earpiece on these telephones. For example, a typical cellular phone may have a flip portion with a mouthpiece integrated into the flip portion and an earpiece which is integrated into a body portion of the telephone. Such cellular phones cannot be effectively coupled to conventional acoustical couplers. Further, the coupling mechanism is usually quite bulky and thus cannot be used with portable PIM devices. As a result, a majority of the commercially available PIM devices from various manufacturers arc typically not equipped with acoustical coupling mechanisms.

Therefore, it is desirable to provide a coupling mechanism/device which can enable communication of information between a communication device, such as a portable PIM, and an acoustic device using acoustic tones without the aforementioned disadvantages. Further, it is desired that the PIM device be able to acoustically communicate with a wide variety of acoustic communication devices, such as telephones, including conventional telephones, cellular telephones, cordless telephones, fax machines and pagers, and other acoustic information sources.

SUMMARY OF THE INVENTION

The present invention provides techniques enabling communication of information between a communication device, such as a PIM device, and an acoustic device, such as a telephone, using acoustic tones. According to an embodiment of the present invention, a coupler is provided which is detachably attachable to a communication device. The coupler may be configured to receive information from an acoustic device in the form of acoustic tones and to communicate the information to the communication device in a form useable/understandable by the communication device. The coupler may also be configured to receive information from the communication device and communicate the information to the acoustic device in the form of acoustic tones.

According to another embodiment of the present invention, the coupler includes a speaker, a microphone, and an adjustment mechanism. The speaker may be used for transmitting information in the form of acoustical tones to the acoustic device while the microphone may be configured to receive information from the acoustic device in the form of acoustical tones. The adjustment mechanism facilitates coupling between the speaker and the acoustic device and between the microphone and the acoustic device.

According to yet another embodiment of the present invention, the coupler may include a biasing mechanism which is used to bias the microphone to sealingly engage an earpiece of the acoustic device. This improves the acoustical coupling between the microphone and the acoustic device. In an embodiment of the present invention, the biasing mechanism may include a spring which biases the microphone away from the coupler and towards the acoustic device to facilitate coupling between the microphone and the earpiece.

According to another embodiment of the present invention, the adjustment mechanism may allow positions of the speaker and microphone to be varied relative to each other. This facilitates acoustic coupling with handset of various shapes and sizes. In an embodiment, the adjustment mechanism may include a microphone adjustment mechanism which allows the position of the microphone to be adjusted relative to the position of the speaker. In another embodiment, the adjustment mechanism may include a speaker adjustment mechanism which allows the position of the speaker to be adjusted relative to the position of the microphone.

According to yet another embodiment of the present invention, the microphone adjustment mechanism may include a microphone carrier supporting the microphone. The microphone carrier may be capable of being moved within a channel of the coupler from a retracted position to an extended position to vary the position of the microphone relative to the speaker. According to an embodiment, the microphone carrier may include a first section which is capable of being moved within the channel and a second section which is rotatably attached to the first section and biased away from the coupler by a biasing mechanism. In another embodiment, the microphone adjustment mechanism may comprise a recess in the coupler into which the microphone is stored when the microphone is in a retracted position.

According to another embodiment of the pre sent invention, a coupler according to the teachings of the present invention may be retrofitted onto the communication device or integrated with the communication device.

The invention will be better understood by reference to the following detailed description, the accompanying figures, and the claims.

BRIEF DESCRIPTION OF THE DRAWINGS

FIG. 9 is a simplified illustration of another embodiment of the coupler in accordance with the invention;

FIGS. 10A and 10B are simplified illustrations of another embodiment of the present invention where the microphone, speaker, and the adjustment mechanisms are positioned along a side portion of a coupler;

DESCRIPTION OF THE SPECIFIC EMBODIMENTS

The present invention provides a coupling mechanism enabling communication of information between a communication device, such as a PIM device, and an acoustic device, such as a telephone, using acoustic tones. Embodiments of the present invention are capable of being coupled to or retrofit on the communication device for acoustically coupling the device to a variety of acoustic devices, such as a telephone and the like. It is in this context that the present invention will be described. It will be appreciated, however, that the coupler in accordance with the invention has greater utility. For example, embodiments of the present invention may be used to couple devices to various other acoustic sources and acoustic communication systems. Additionally, embodiments of the present invention may also be integrated with the handheld or PIM device.

Figure 2A:
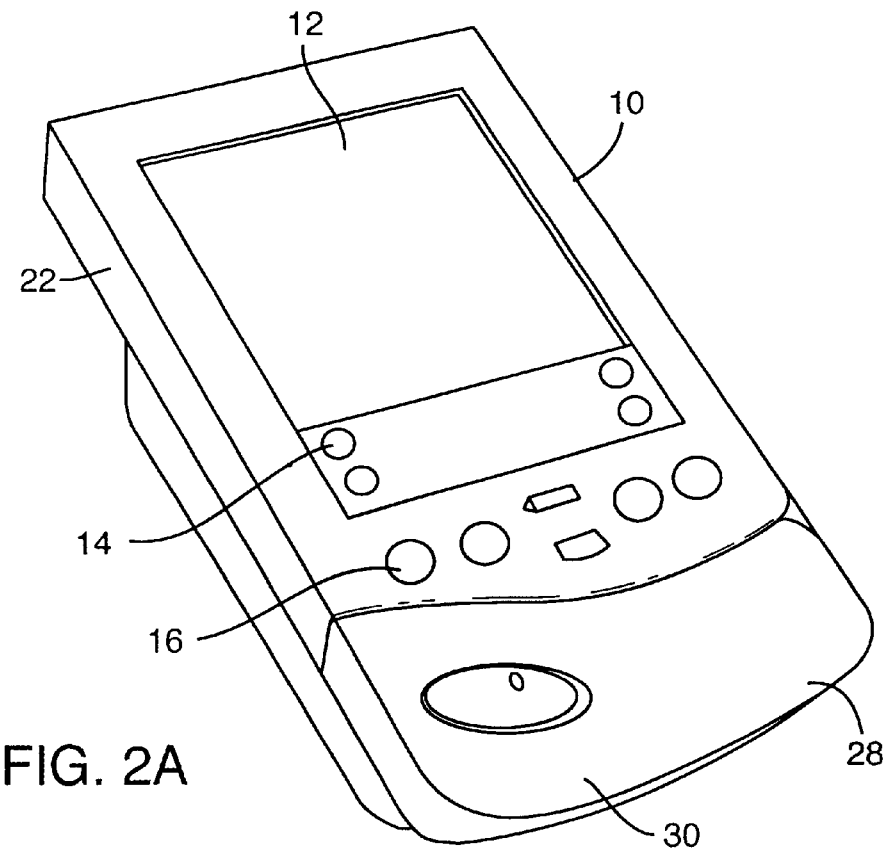
FIGS. 2A–2D are simplified illustrations of a coupling device in accordance with the principles of the present invention.
Figure 2B:
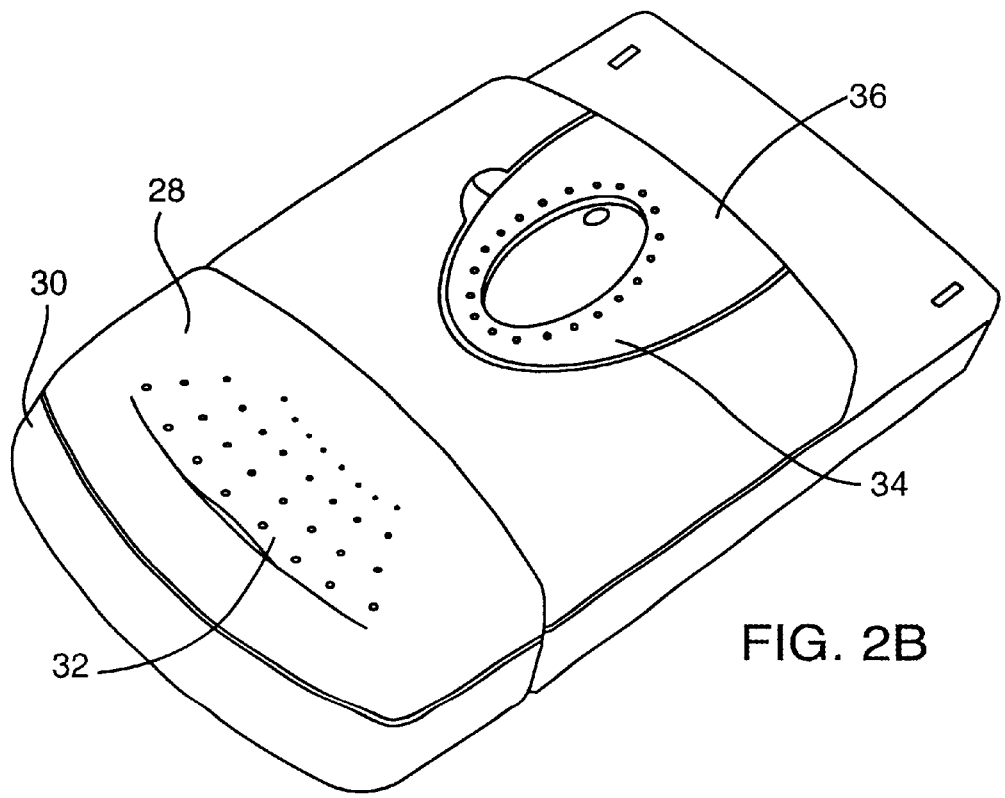

FIGS. 2A–2D are simplified illustrations of a coupling device 28 in accordance with the principles of the present invention. FIG. 2A depicts a coupler 28 having a housing 30 coupled to a handheld device or PIM device 10. As shown in FIG. 2A, coupler 28 is shown attached to a bottom portion of handheld device 10. In particular, coupler 28 may be coupled to device 10 through electrical access port 20 of device 10. FIG. 2B depicts a back-side view of coupler 28 depicted in FIG. 2A. As shown, housing 30 of coupler 28 comprises a speaker 32, and a microphone 34 supported on an microphone adjustment mechanism 36. In FIGS. 2A–2D microphone adjustment mechanism 36 includes a microphone carrier on which microphone 34 is supported. Microphone 34 and speaker 32 enable coupler 28 to be acoustically coupled with an acoustic device such as a telephone.

Microphone 34 may be configured to receive acoustic tones from the earpiece of a telephone handset, while speaker 32 may be configured to communicate acoustic tones to the mouthpiece of a telephone handset. Microphone adjustment mechanism 36 depicted in FIG. 2B is shown in a retracted/closed position and is housed within a recess 38 (see FIG. 2C) in the bottom of coupler 28. Recess 38 protects microphone 34 from damage when extendable member 36 is in the retracted position.

Figure 1:
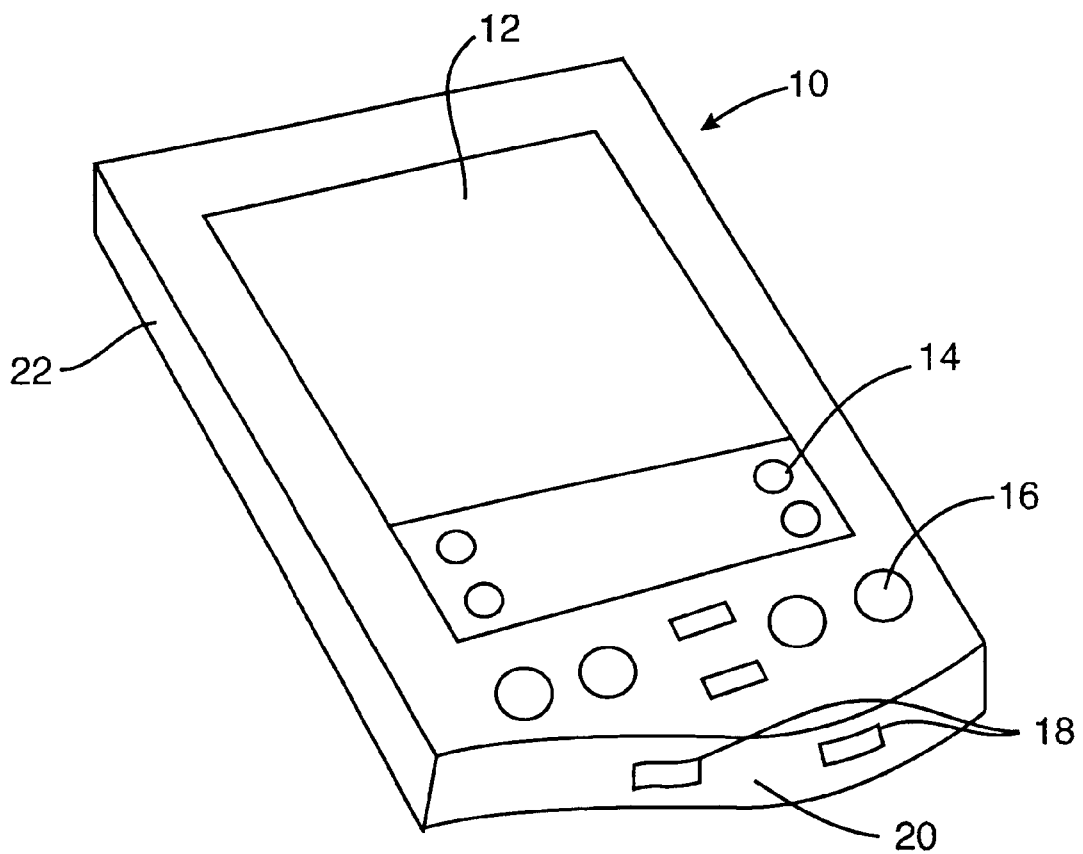
FIG. 1 is a simplified illustration of an exemplary portable handheld PIM to be used with the present invention.

Coupler 28 may be configured to receive information encapsulated in the form of acoustical tones from an acoustic device such as a telephone and forward the information to device 10 in a format useable and understandable by device 10 via a communication link between coupler 28 and device 10. Further, coupler 28 may be configured to receive information from device 10, generate acoustical tones encapsulating the received information, and communicate the acoustical tones to the telephone via an acoustical communication link. For device 10 depicted in FIG. 2A, the communication link between coupler 28 and device 10 may be established using access port 20 having contacts 18 (see FIG. 1) located on device 10. Base portion 30 of coupler 28 may include an electronic package capable of translating information between acoustical formats and formats understandable/useable by device 10. Accordingly, coupler 28 enables device 10 to receive and transmit information from/to acoustic devices even though device 10 does not by itself have the capability to exchange information via acoustic tones. Device 10 shown in FIG. 2A is only an example of a device which may use coupler 28 in accordance with the present invention. Various other devices may be also used in conjunction with coupler 28.

In order to establish an acoustical communication link between coupler 28 and a telephone handset, proper coupling needs to be established between coupler 28 and the telephone set. Coupler 28 in accordance with the present invention ensures a good acoustical coupling of the mouthpiece and earpiece of the telephone handset with speaker 32 and microphone 34. The acoustical coupling is facilitated by microphone adjustment mechanism 36 which allows the positions of speaker 32 and microphone 34 to be adjusted relative to each other. Accordingly, speaker 32 may be properly aligned with a mouthpiece of an acoustic device and microphone 34 may be properly aligned with an earpiece of the acoustic device. Further, according to the present invention, microphone adjustment mechanism 36 enables proper coupling between microphone 34 and speaker 32 and handsets of varying shapes and sizes. The acoustical coupling may be further facilitated by pressing microphone 34 and speaker 32 of coupler 28 against the earpiece and mouthpiece, respectively, of the telephone handset.

Figure 2C:
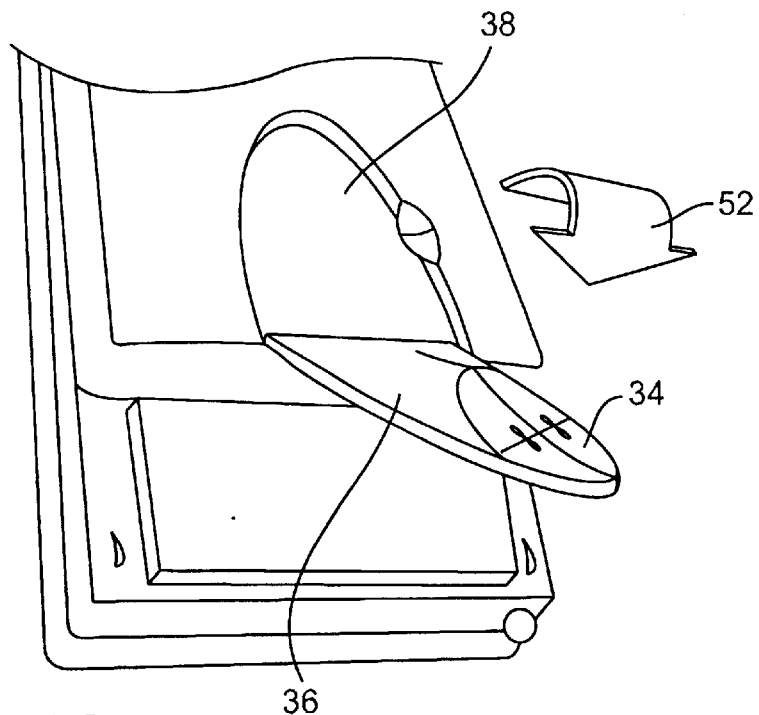

FIG. 2C is a perspective view of the bottom of coupler 28 showing microphone adjustment mechanism 36 including the microphone carrier in an extended or open position. As shown, microphone 34 is mounted on microphone adjustment mechanism 36 which may be hinged to coupler 28 and be opened by rotating it in direction 52 about the hinge. When microphone adjustment mechanism 36 is in the open position, microphone 34 is exposed so that it may be coupled to the earpiece of a telephone handset. A biasing mechanism, such as a conventional spring, may be used to interconnect the body portion of coupler 28 to microphone adjustment mechanism 36 such that the microphone carrier portion of microphone adjustment mechanism 36 is biased away from coupler 28 when extended.

Figure 2D:
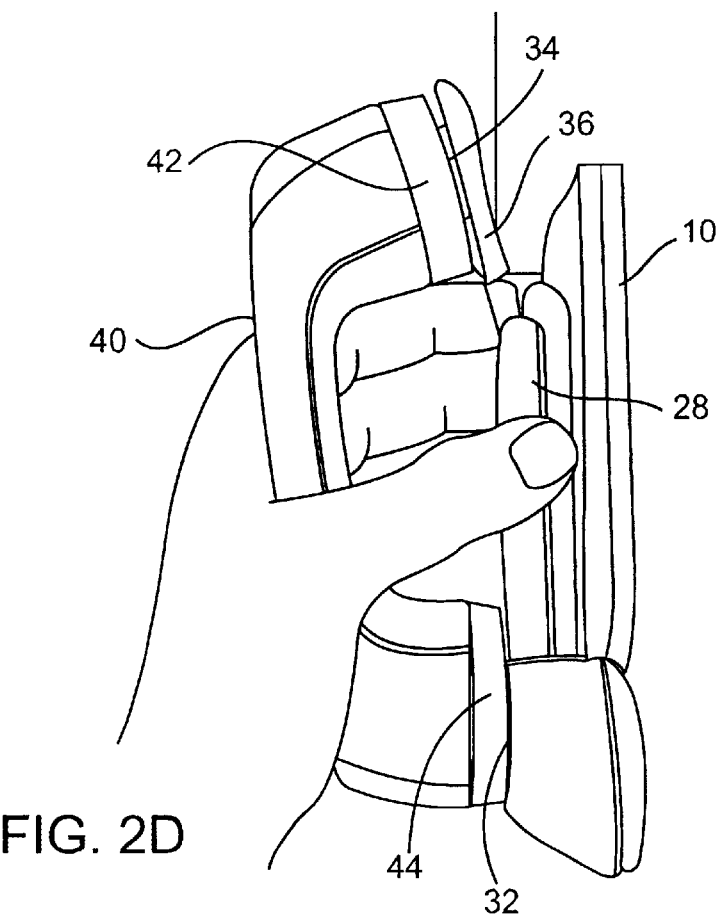
Figure 3:
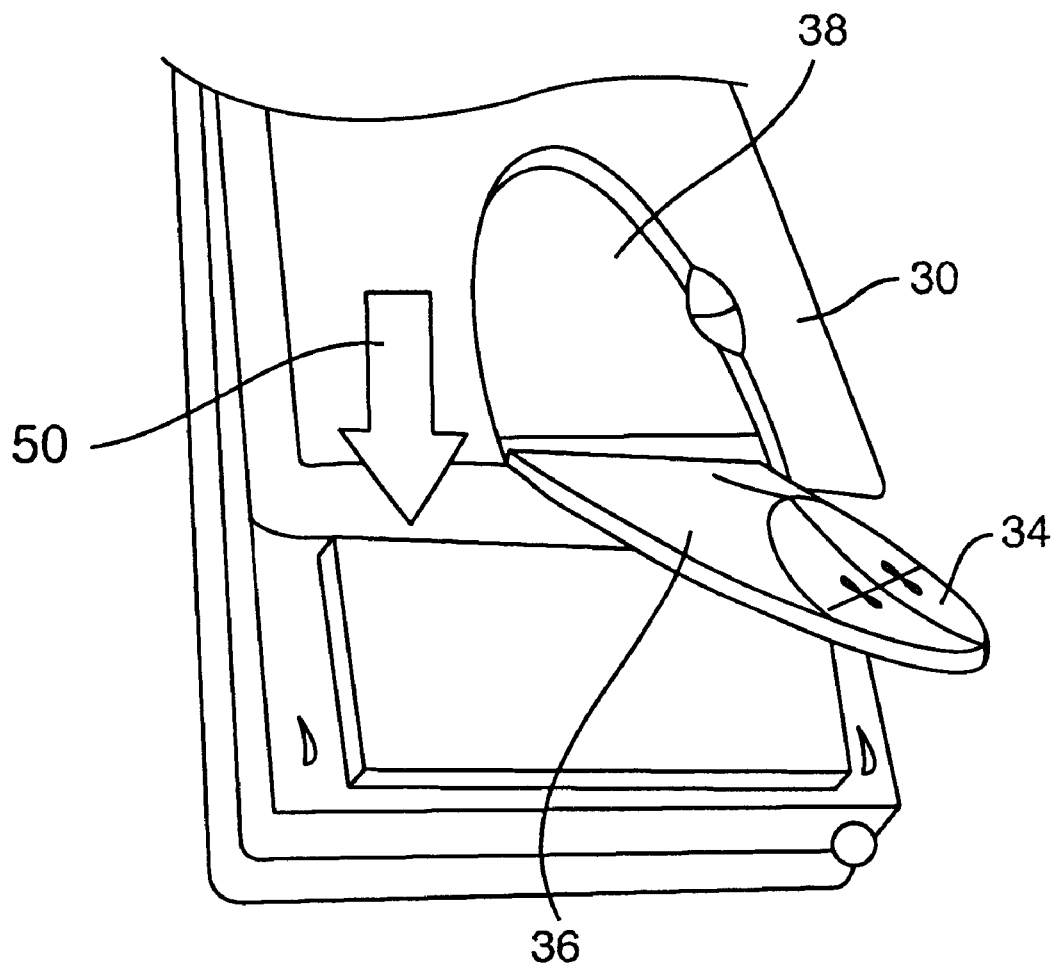
FIG. 3 is a simplified perspective view of the bottom side of a coupler according to an embodiment of the present invention.

Referring to FIG. 2D, a perspective view of a telephone handset 40 and coupler 28 are shown acoustically coupled together in accordance with an embodiment of the present invention. As shown, speaker 32 of coupler 28 is aligned with mouthpiece 44 of handset 40 and microphone adjustment mechanism 36 has been adjusted such that microphone 34 is aligned with earpiece 42 of handset 40. Further, when telephone handset 40 is pressed against coupler 28, microphone adjustment mechanism 36 which is spring-biased away from coupler 28 generates a force which presses microphone 34 against earpiece 42 of handset 40. The force exerted by the biasing mechanism helps establish better acoustical seal/coupling between microphone 34 and earpiece 42 of telephone handset 40.

In the embodiment depicted in FIG. 2D, speaker 32 may be open coupled (i.e. there is no acoustic seal around speaker 32) to the mouthpiece and does not typically need to be pressed against telephone handset 40 as mouthpiece 44 of telephone handset 40 is less sensitive to external noise. Further, speaker 32 may generate acoustic tones having an intensity level of between 90 to 100 dB so that a tight acoustical coupling (like microphone 34) is not necessary. In alternate embodiments of the present invention, speaker 32 may also be disposed on a biased speaker carrier to facilitate coupling between the speaker and mouthpiece 44.

FIGS. 3–7 are perspective views illustrating different embodiments of coupler 28 in accordance with different embodiments of the present invention. In the embodiment depicted in FIG. 3, microphone adjustment mechanism 36 may slide in and out (in direction 50) of a channel on coupler 28 in order to vary the distance between microphone 34 and speaker 32. This facilitates acoustical coupling with telephone handsets of different sizes. Body portion 30 of coupler 28 may be manufactured out of a light weight metal, such as aluminum or hard plastic. Microphone adjustment mechanism 36 may also be manufactured out of a light weight metal, such is aluminum or hard plastic.

Figure 4:
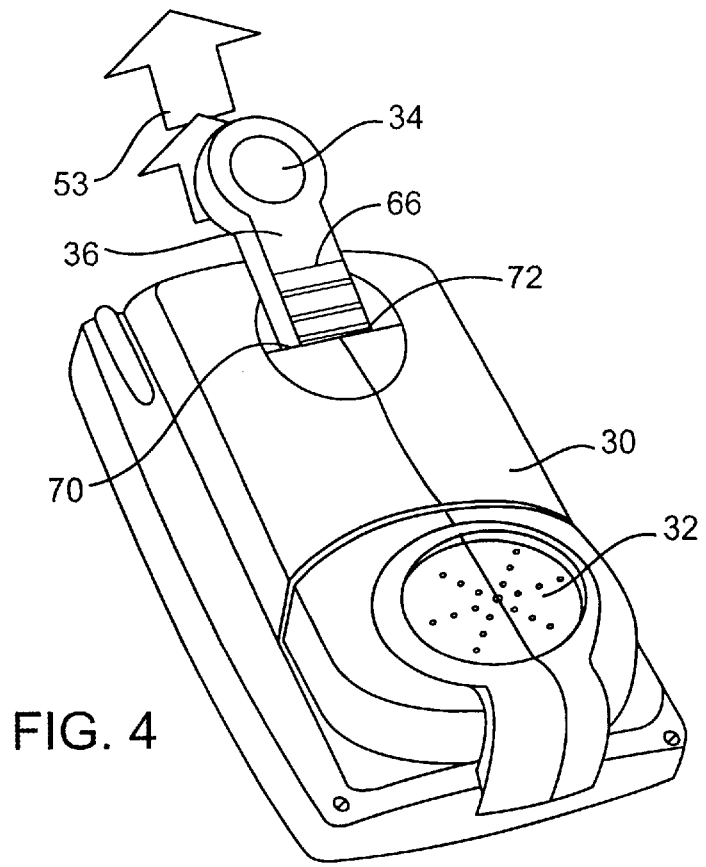
FIGS. 4 and 5 are simplified perspective views of an embodiment of the present invention with an extendible microphone adjustment mechanism.

FIG. 4 depicts an embodiment of coupler 28 wherein microphone adjustment mechanism 36 includes a detent or series of detents 66 which interact with teeth 72 in channel 70 of coupler 28 to allow extension of microphone adjustment mechanism 36 in direction 53 to one or more extended positions. A biasing mechanism may be used to bias microphone adjustment mechanism 36 away from coupler 28 such that microphone adjustment mechanism 36 provides a force directly behind microphone 34 to facilitate better coupling between microphone 34 and the earpiece of a telephone handset.

Figure 5:
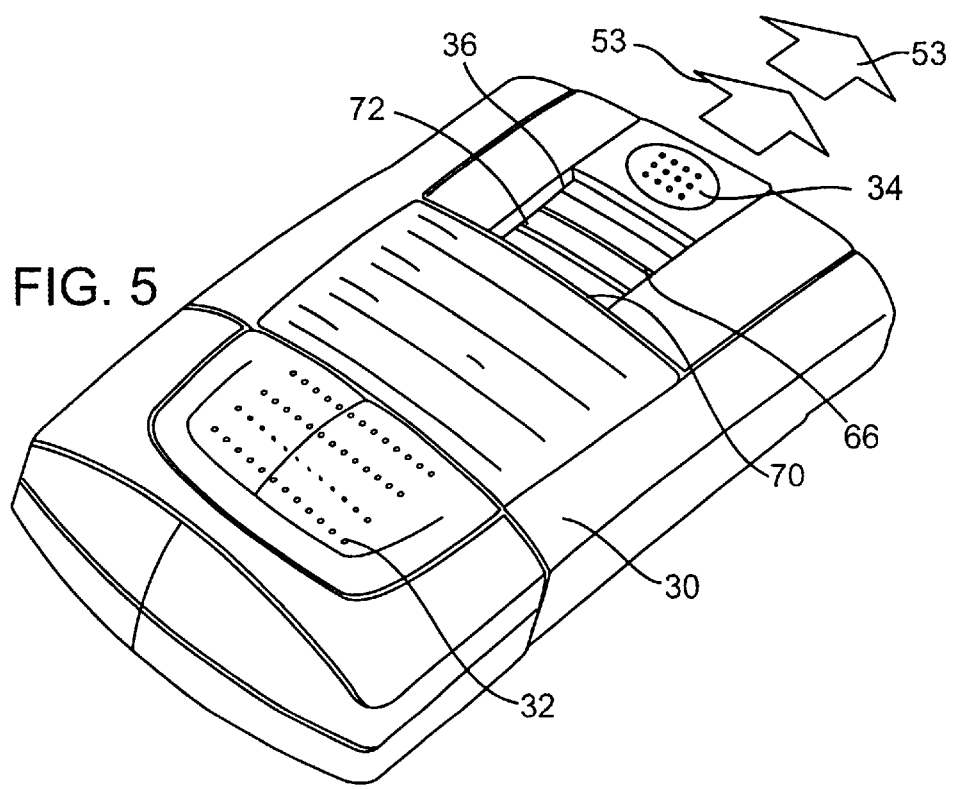
Figure 6:
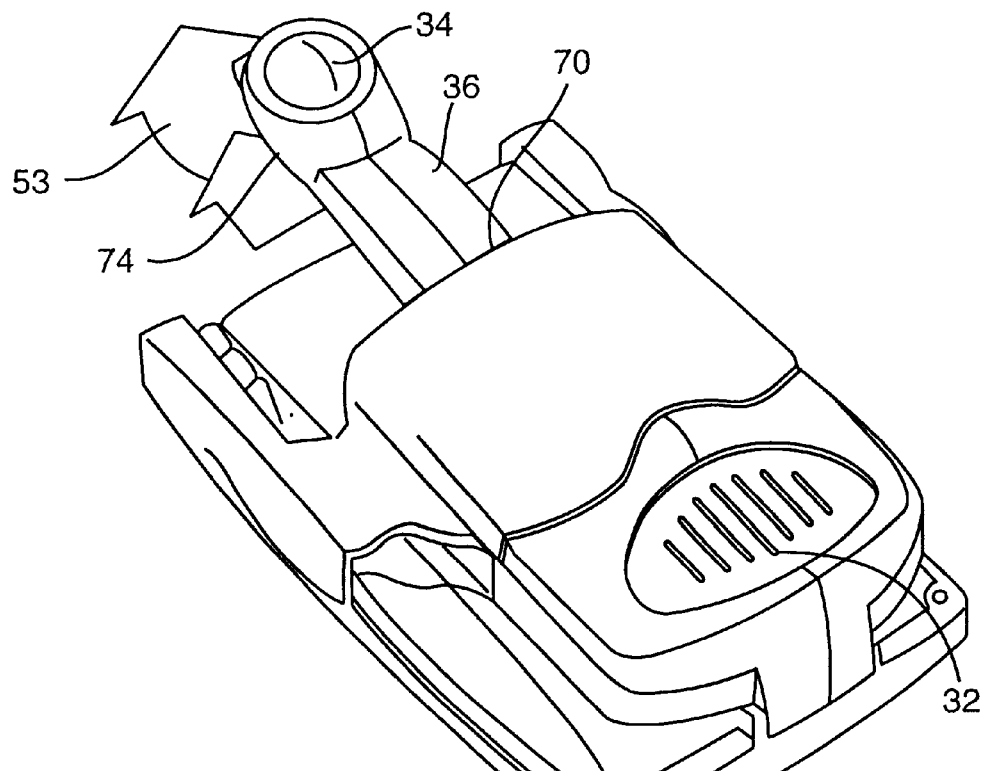
FIGS. 6 and 7 are simplified perspective views of yet another embodiment of the present invention with an extendible microphone adjustment mechanism.
Figure 7:
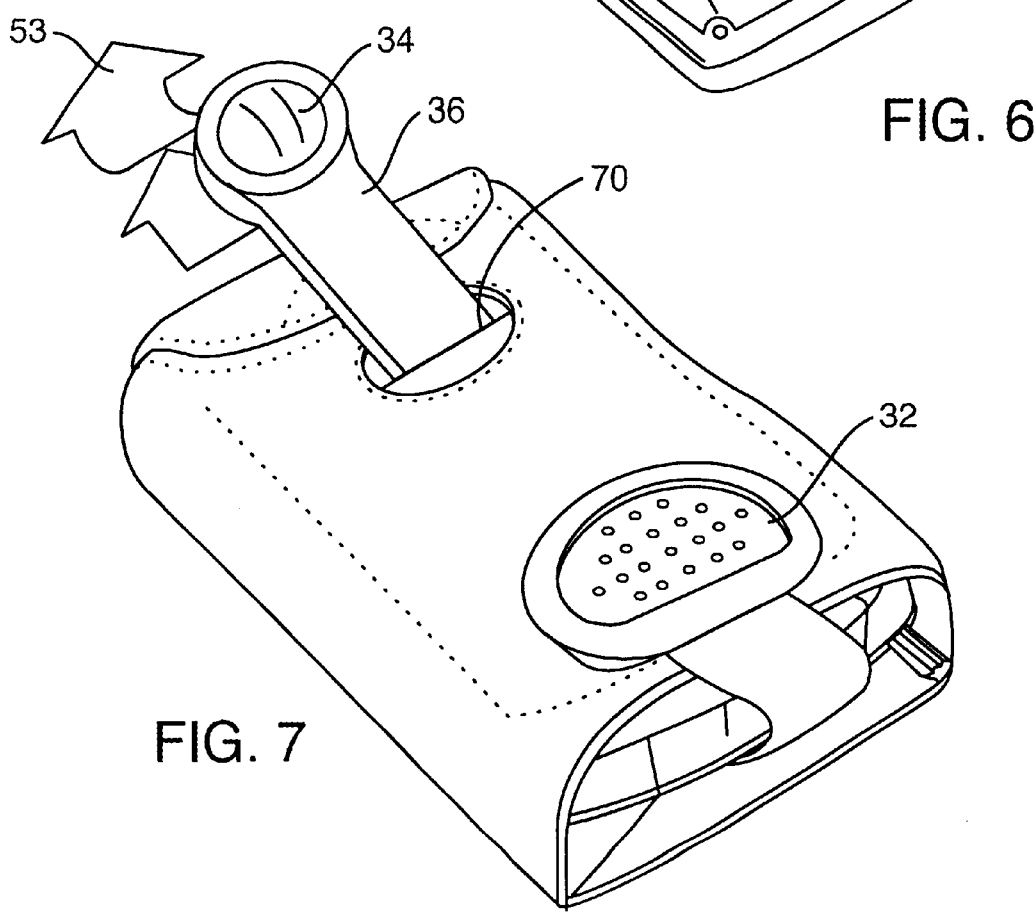

FIG. 5 depicts a prospective view of yet another embodiment of coupler 28 in accordance with the present invention. In this embodiment, speaker 32 is located at a fixed position on coupler 28 while microphone adjustment mechanism 36 which includes a microphone carrier supporting microphone 34 may be adjusted relative to speaker 32 to accommodate different types of telephone handsets. In this embodiment, coupler 28 may include a channel 70 into which extendable member 36 may retract. Accordingly, microphone adjustment mechanism 36 may slide in channel 70 between an extended position and a retracted position. In this embodiment, microphone adjustment mechanism 36 may be pre-flexed and stored in a flat position so that, as it is extended, it moves away from coupler 28. Microphone adjustment mechanism 36 may include indentations 72 near the entry point of channel 70 which keep microphone adjustment mechanism 36 from sliding back and forth and from being pushed back into the channel 70. FIGS. 6 and 7 depict alternate embodiments of the present invention.

Figure 8A:
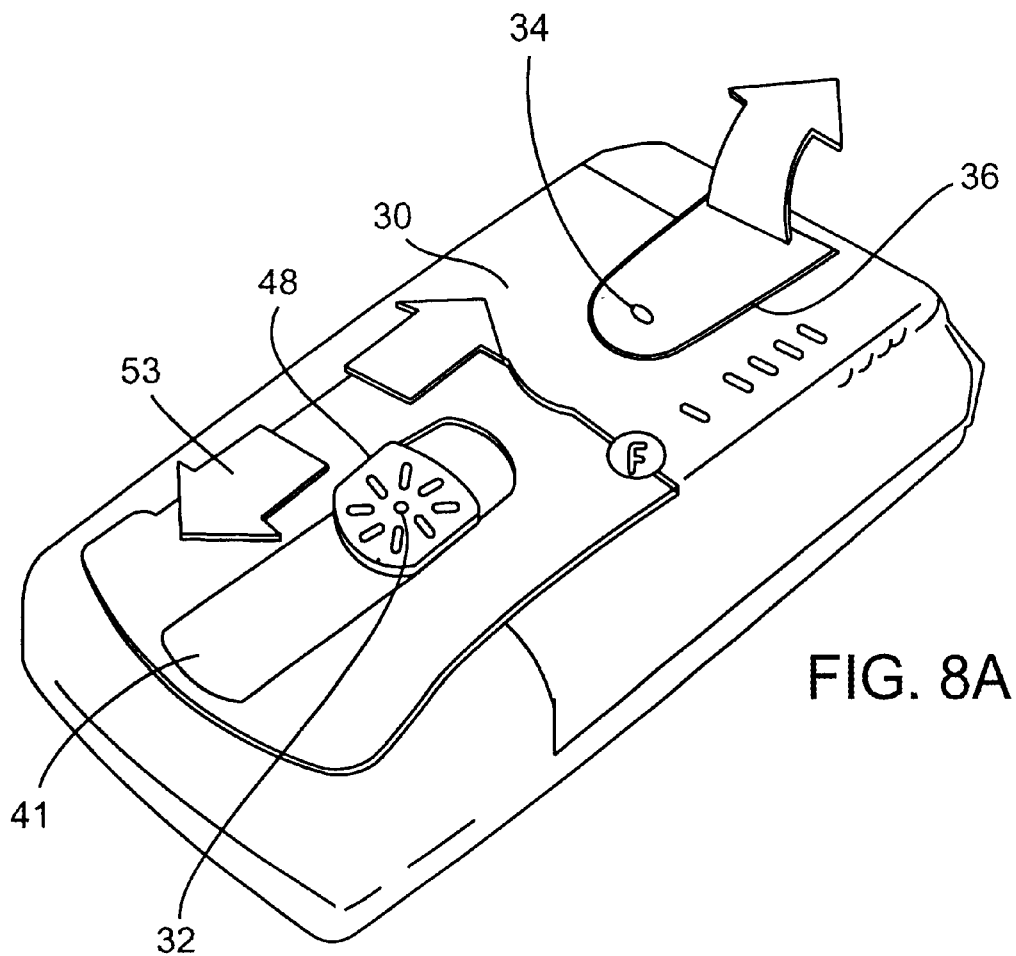
FIGS. 8A and 8B are simplified illustrations of an embodiment of the present invention wherein the position of the speaker can be varied relative to the microphone.
Figure 8B:
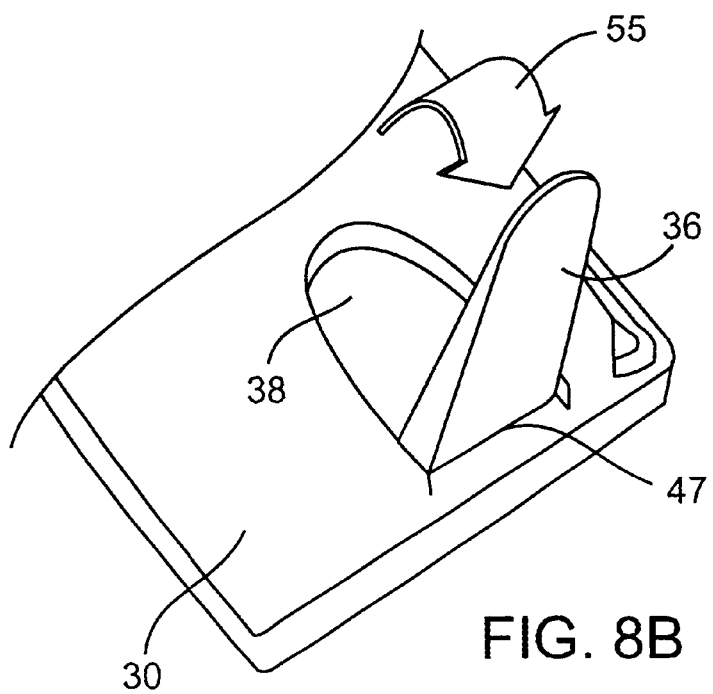

FIGS. 8A and 8B depict simplified illustrations of an embodiment of coupler 28 in accordance with the teachings of the present invention. In this embodiment, coupler 28 may include a speaker 32 mounted on a speaker adjustment mechanism 48 and a microphone 34 mounted on microphone adjustment mechanism 36. In accordance with this embodiment of the invention, speaker 32 is capable of being moved (i.e., slid) in direction 53 within a recess/track 41 to vary the position of speaker 32 relative to microphone 34. The position of speaker 32 may accordingly be adjusted relative to microphone 34 to facilitate coupling with handsets of different shapes and sizes.

Microphone adjustment mechanism 36 may rest in a recess 30 in the closed position. A spring-biased hinge member 47 may be used to attach microphone adjustment mechanism 36 to body portion 30 of coupler 28. Hinge member 47 may keep microphone adjustment mechanism 36 in a closed position unless opened by application of a force in direction 55 which overcomes the bias force of the hinged member. Microphone adjustment mechanism 36 may be rotated about hinge 47, as shown in FIG. 8B, to expose microphone 34 so that it may be coupled to the earpiece of the telephone handset. Hinge 47 may spring-bias microphone adjustment mechanism 36 away from coupler 28 so that when the telephone handset is pressed against coupler 28, microphone adjustment mechanism 36 may press microphone 34 against a handset earpiece to achieve a good acoustical coupling.

FIG. 9 depicts another embodiment of coupler 28 in accordance with the present invention. Coupler 28 in FIG. 9 includes a fixed position speaker 32, and a microphone 34 mounted on one end of microphone adjustment mechanism 36. Microphone adjustment mechanism 36 may be attached to coupler 28 by a spring-biased hinge 94. Microphone adjustment mechanism 36 may be rotated in direction 58 between a closed, retracted position within a cavity 96, and an open, extended position as shown in FIG. 9.

FIGS. 10A and 10B depict another embodiment of coupler 28 in accordance with the present invention where microphone 34 and speaker 32 are disposed along a side portion of coupler 28. As shown, coupler 28 may include a microphone arm 66 (shown in a retracted position) on which microphone 34 is mounted, and a speaker arm 68 on which speaker 32 is mounted. Microphone arm 66 and speaker arm 68 may be slidably connected together. The position of microphone 34 relative to speaker 32 may be adjusted by sliding microphone arm 66 in the direction of arrow 54 out of sleeve 56. Microphone arm 66 may also be attached to a biasing member, such as a conventional spring, which interconnects arm 66 to the base portion of coupler 28 such that microphone arm 66 when extended is biased away from coupler 28 to provide better coupling with an earpiece of an acoustic device.

Figure 11A:
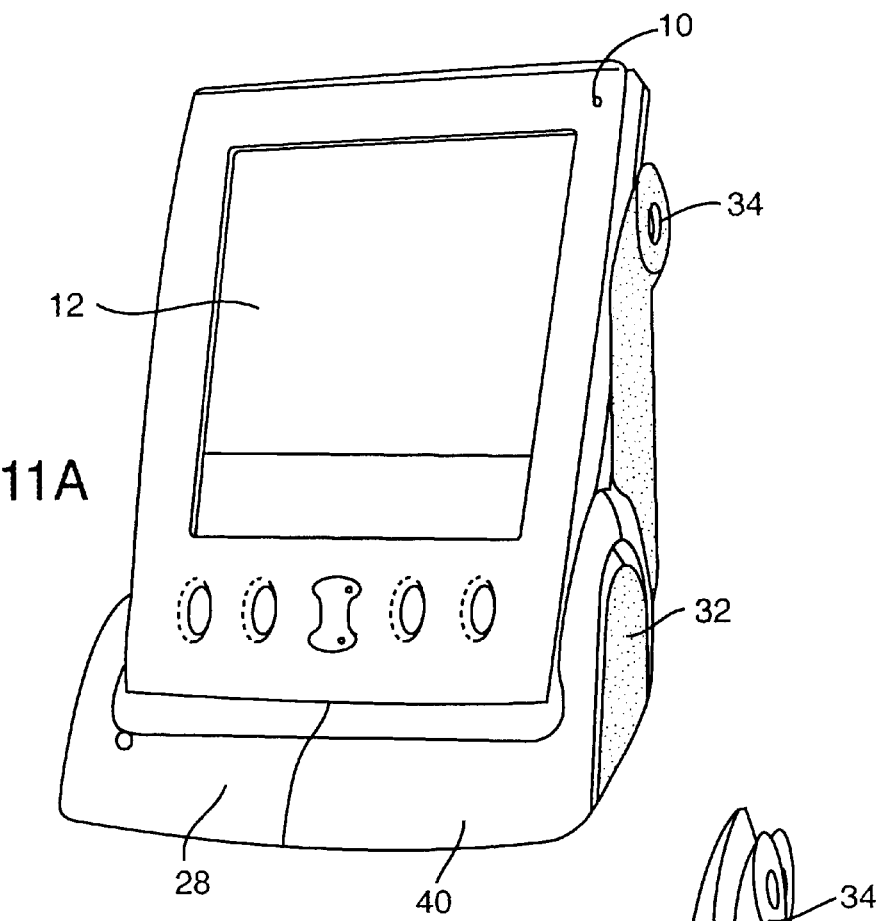
FIGS. 11A and 11B are simplified illustrations of the coupler and the communication device coupled together in accordance with another embodiment of the invention.
Figure 11B:
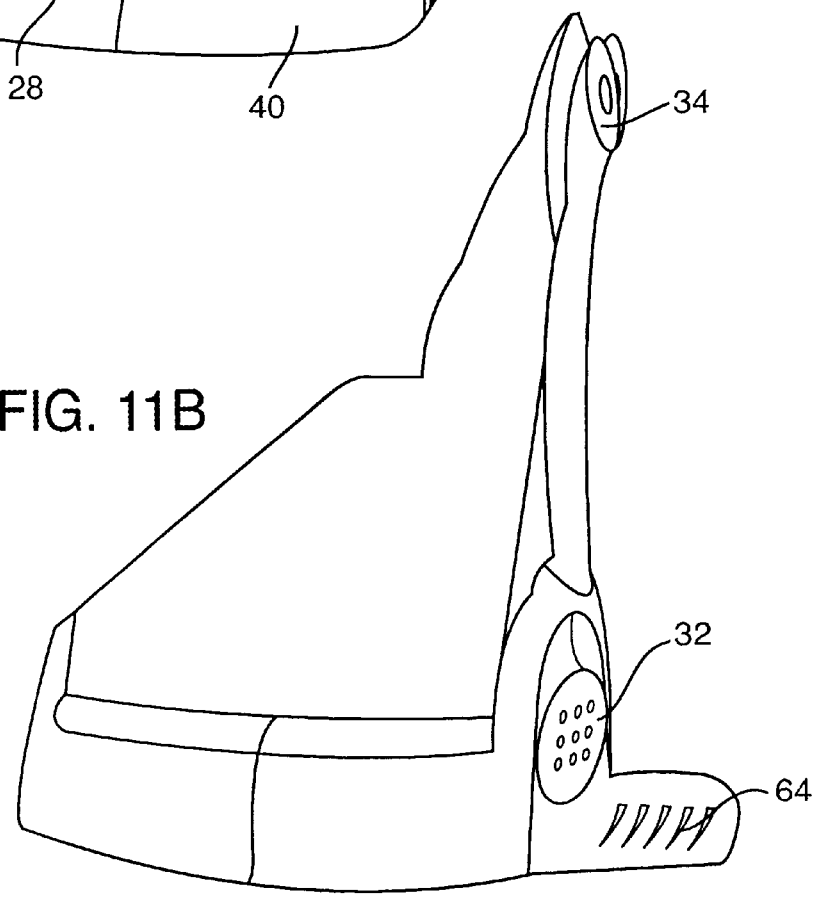

FIGS. 11A and 11B depict perspective views of another embodiment of coupler 28. In this embodiment, coupler 28 may be formed as a support device, which includes a base portion 40 capable of receiving device 10, such that device 10 may be held in an upright position. This allows a user to view display 12 without having to hold device 10. Coupler 28 includes a microphone 34 and a speaker 32 disposed along a side portion of coupler 28. As shown in FIG. 11B, a cradle 64 may also be disposed below speaker 32 in order to hold the mouthpiece against speaker 32 to improve the acoustic coupling.

Figure 12A:
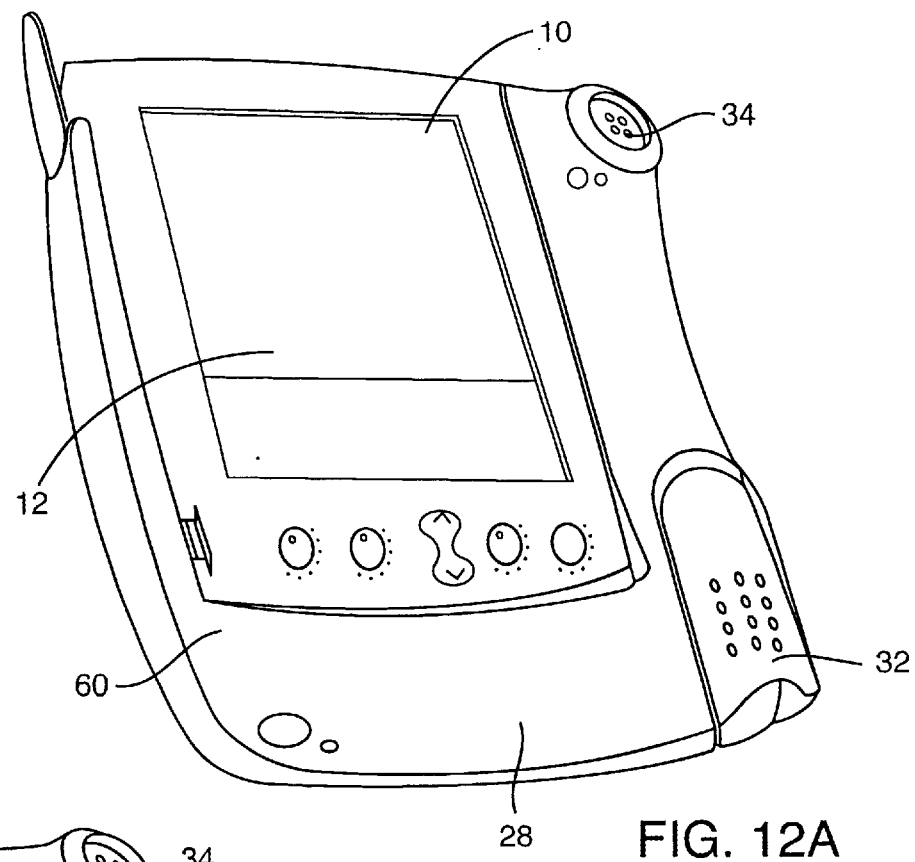
FIGS. 12A, 12B, and 12C are simplified illustrations of another embodiment of the coupler in accordance with the invention.
Figure 12B:
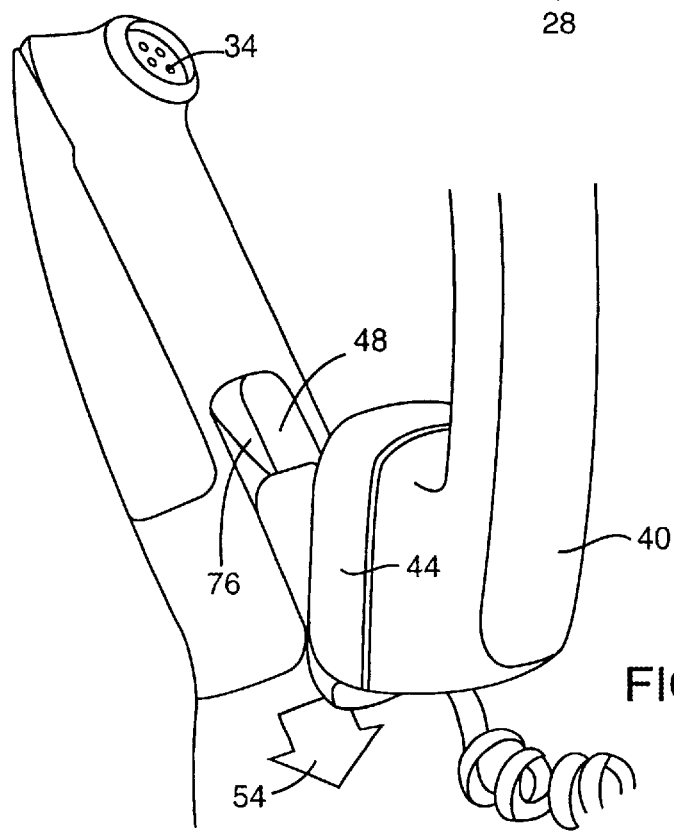
Figure 12C:
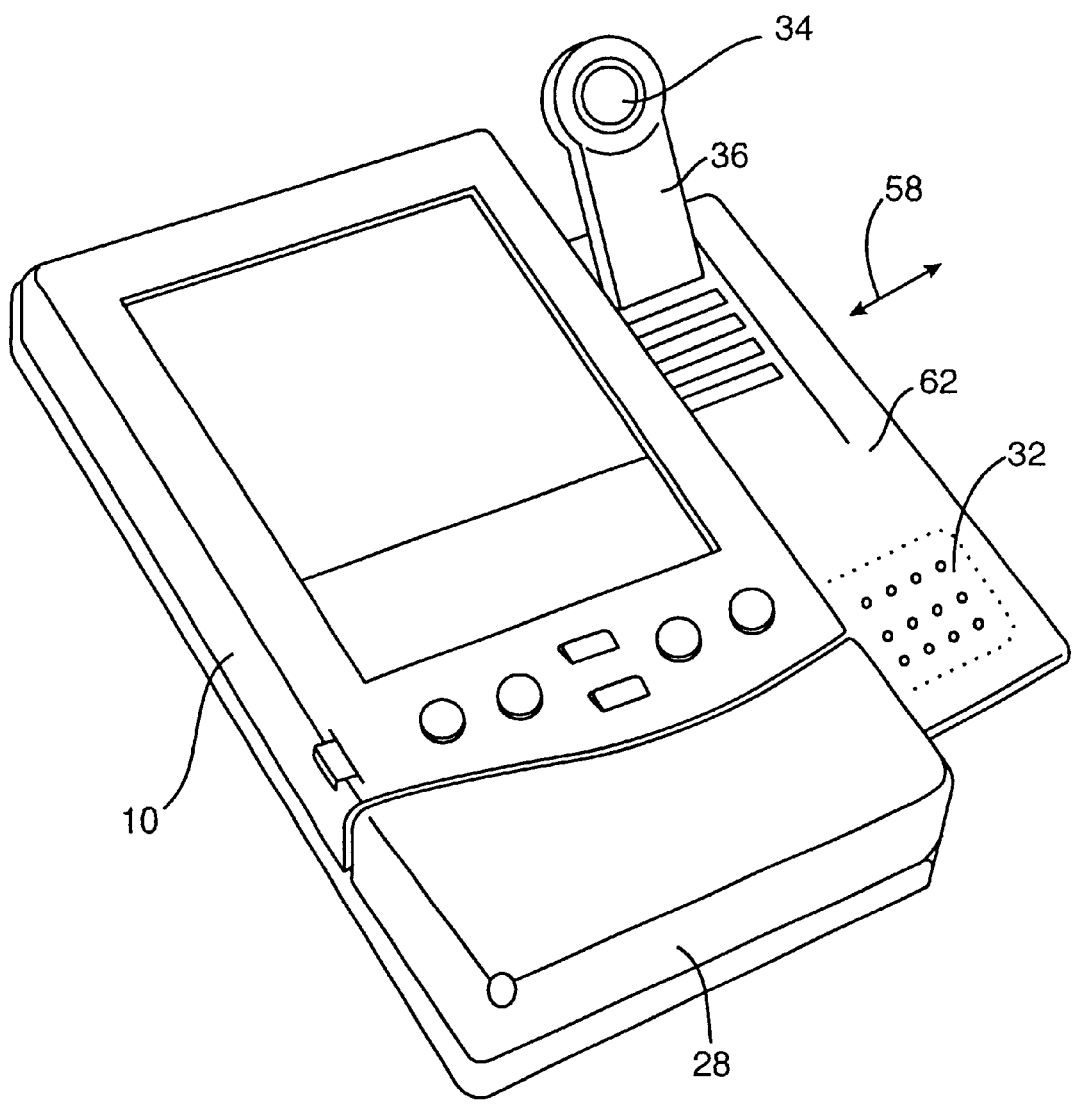

FIGS. 12A, 12B, and 12C depict perspective views of different embodiments of coupler 28 and handheld device 10 coupled together in accordance with the invention. In this embodiment, coupler 28 may be formed as a support device, which includes a base portion 60 capable of receiving device 10, such that device 10 may be held in an upright position. In this manner, display 12 can be easily viewed while the handset rests on microphone 34 and speaker 32 of coupler 28. In the embodiment depicted in FIGS. 12A and 12B, microphone 34 is located at a fixed position on coupler 28 while speaker 32 may be adjusted in direction 54 relative to microphone 34 to accommodate different types of telephone handsets.

As shown in FIG. 12B, speaker 32 may be configured on speaker adjustment mechanism 48 which can slide in recess 76 between an extended position and a retracted position. To bias speaker adjustment mechanism 48 away from coupler 28, the lower portion of speaker adjustment mechanism 48 may rest against recess 76 in an extended position, and push speaker 32 away from coupler 28. When a telephone handset is positioned over speaker 32, speaker adjustment mechanism 48 may bend to further improve acoustical coupling between mouthpiece 44 and speaker 32. To further increase the biasing force, a flexible member may be attached to speaker adjustment mechanism 48 so that as speaker adjustment mechanism 48 is extended, the flexible member further biases speaker adjustment mechanism 48 away from coupler 28. Alternatively, coupler 28 may be configured such that speaker 32 is fixed and microphone 34 is extendable and retractable in the same manner as described above.

FIG. 12C depicts an embodiment of coupler 28 which includes a speaker 32, microphone adjustment mechanism 36, and microphone 34 configured on a side portion 62 of coupler 28 which may extend as a whole from coupler 28 and may be retracted into a recessed portion of coupler 28 in direction 58. As shown, microphone 34 is mounted on microphone adjustment mechanism 36 which may be adjusted to match the distance between the earpiece and mouthpiece of a telephone handset.

Figure 13:
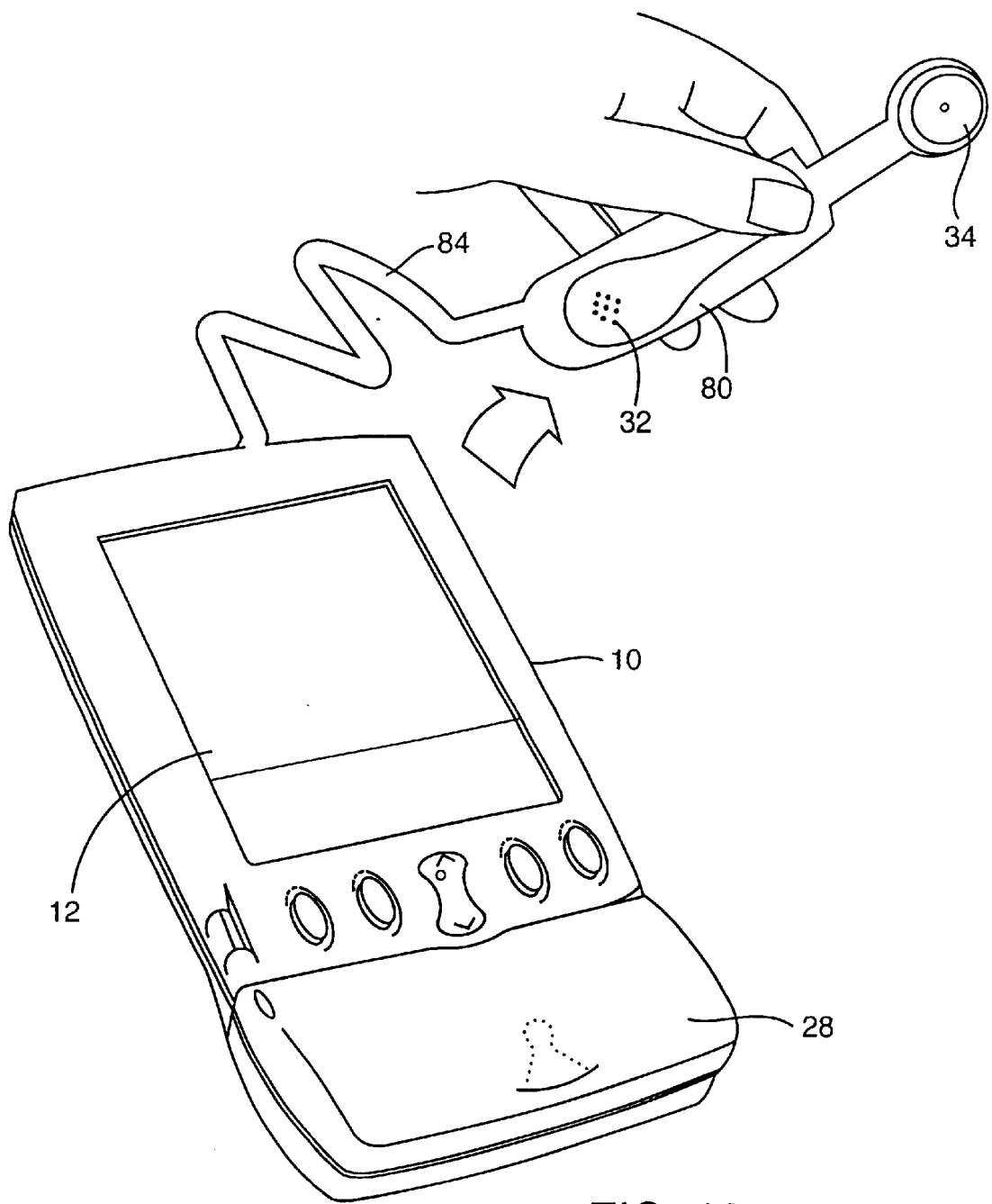
FIG. 13 is a simplified illustration of a coupler with a detachable microphone and speaker portion according to the teachings of the present invention.

FIG. 13 depicts a perspective view of another embodiment of coupler 28 with a detachable portion 80 which contains speaker 32 and microphone 34. Detachable portion 80 is connected to coupler 28 via connector 84 and allows access to remote telephone handsets or other systems that may not be accessible with the combination of device 10 and coupler 28.

Figure 14A:
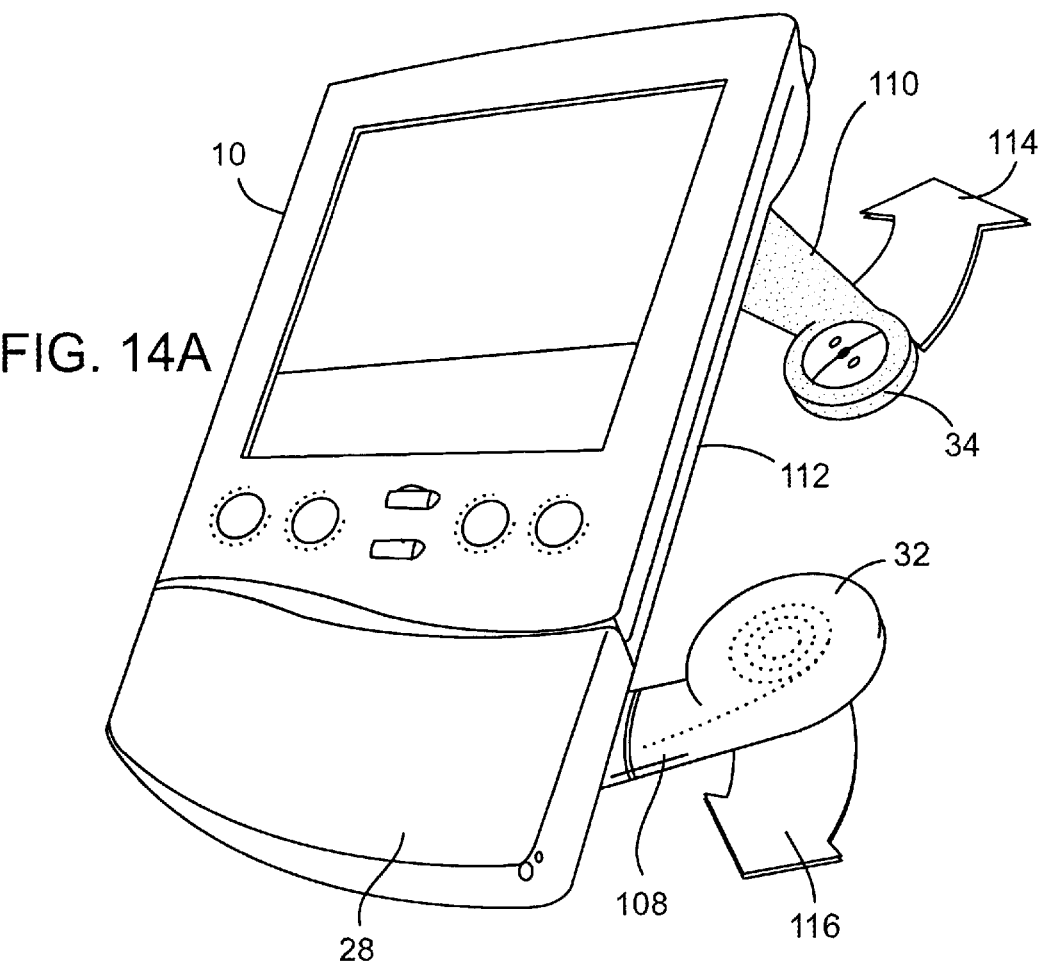
FIGS. 14A and 14B are simplified illustrations of yet another embodiment of the present invention.
Figure 14B:
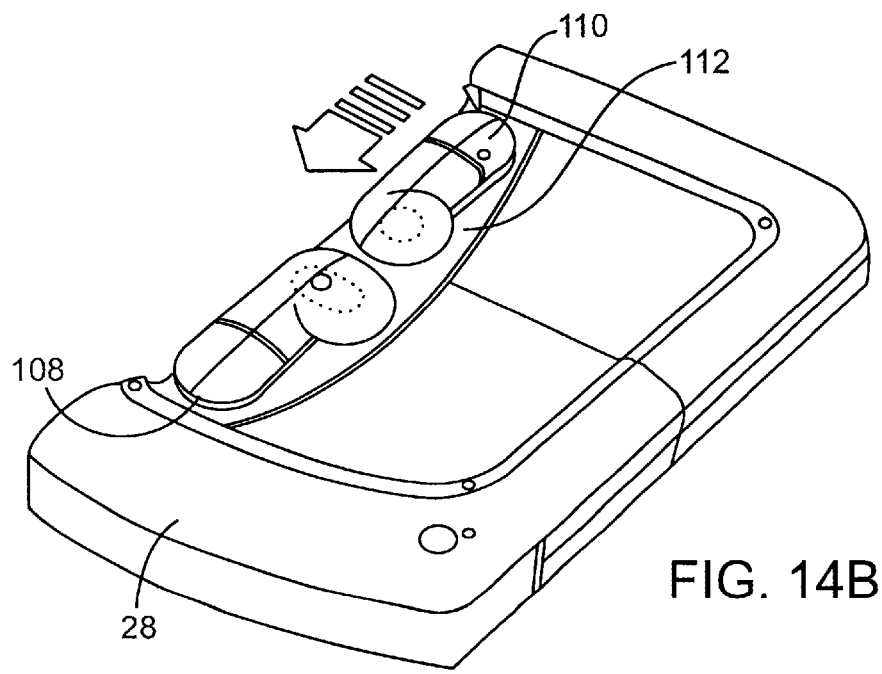

FIGS. 14A and 14B depict various views of an embodiment of coupler 28 in accordance with the invention. As shown in FIG. 14A, coupler 28 may include a speaker arm 108 which supports speaker 32 and a microphone arm 110 which supports microphone 34 configured on coupler 28. Arms 108 and 110 are connected to coupler 28 such that they can extend from a side portion of coupler 28. Arms 108 and 110 may be retracted into recessed portion 112 of coupler 28 by folding the arms inward toward the centerline of coupler 28. In operation, arms 108 and 110 are made to swing outward in the direction of arrows 114 and 116 until the distance between speaker 32 and microphone 34 has been adjusted to match the distance between the mouthpiece and earpiece of the telephone handset.

Although specific embodiments of the invention have been described, various modifications, alterations, alternative constructions, and equivalents are also encompassed within the scope of the invention. The described invention is not restricted to operation within certain specific environments, but is free to operate within a plurality of environments.

The present invention may be used in a wide variety of applications. The embodiments of the present invention have been described wherein microphone 34 and speaker 32 have been configured on coupler 28. In alternate embodiments of the present invention, coupler 28 itself may be integrated with device 10. For example, speaker 32, microphone 34, microphone adjustment mechanism 36, speaker adjustment mechanism 48, and the other components of the various embodiments described above may be integrated into device 10 or may alternatively be retrofitted onto device 10.

Further, while the present invention has been described using a particular combination of hardware, it should be recognized that other combinations of hardware are also encompassed within the scope of the present invention. The present invention may also be implemented using combinations of hardware and software.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A system for enabling communication of information between a first device and a second device, comprising:

a coupler detachably attachable to the first device, the coupler configured to receive information from the second device in the form of acoustic tones and to communicate the information received from the second device to the first device in a form useable by the first device, and to receive information from the first device and communicate the information to the second device in the form of acoustic tones; wherein the coupler comprises a speaker for transmitting the information in the form of acoustical tones to the second device, a microphone for receiving information from the second device in the form of acoustical tones, and an adjustment mechanism for facilitating coupling between the speaker and the second device and between the microphone and the second device; and a biasing mechanism for biasing the microphone to engage an earpiece of the second device to establish an acoustical coupling between the microphone and the earpiece, wherein the biasing mechanism comprises a spring tending to bias the microphone away from the coupler to facilitate coupling between the microphone and the earpiece.

2. The system of claim 1 wherein the first device is a portable handheld device.

3. The system of claim 2, wherein the speaker, the microphone, and the adjustment mechanism are disposed along a side portion of the coupler.

4. The system of claim 1, wherein the microphone and the speaker are positioned juxtaposed to the first device when the coupler is mounted on the first device.

5. The system of claim 1 wherein the microphone is biased to sealing engage the earpiece of the second device.

6. The system of claim 1 wherein the adjustment mechanism is configured to allow adjustment of positions of the speaker and microphone relative to each other to vary the distance between the microphone and the speaker.

7. The system of claim 6 wherein the adjustment mechanism comprises a microphone adjustment mechanism for adjusting the position of the microphone relative to the position of the speaker.

8. The system of claim 7 wherein the microphone adjustment mechanism comprises a microphone carrier supporting the microphone, the microphone carrier capable of being moved within a channel of the coupler from a retracted position to an extended position, the moving of the microphone carrier adjusting the position of the microphone relative to the speaker.

9. The system of claim 8, wherein the microphone carrier comprises a first section which is capable of being moved within the channel and a second section which is rotatably attached to the first section and biased away from the coupler by a biasing mechanism.

10. The system of claim 8, wherein the microphone carrier comprises a plurality of bend points near the microphone which bends as the earpiece of the second device is pressed against the microphone carrier and biases the microphone towards the earpiece.

11. The system of claim 7 wherein the microphone adjustment mechanism comprises a recess in the coupler into which the microphone is stored when the microphone is in a retracted position.

12. The system of claim 7 wherein the microphone adjustment mechanism comprises:

a microphone recess in the coupler; and a microphone carrier rotatably attached to the coupler that moves from a closed position in the microphone recess to an open position, wherein the microphone is exposed only when the microphone carrier is in the open position.

13. The system of claim 6 wherein the adjustment mechanism comprises a speaker adjustment mechanism for moving the position of the speaker relative to the position of the microphone.

14. The system of claim 13 wherein the speaker adjustment mechanism further comprises a speaker carrier supporting the speaker, the speaker carrier capable of being moved within a channel of the coupler from a retracted position to an extended position, the moving of the speaker carrier adjusting the position of the speaker relative to the microphone.

15. A method of communicating information between a first device and a second device, the method comprising:

providing a coupler detachably coupled to the first device;

acoustically coupling the coupler to the second device;

communicating information from the second device to the coupler in the form of acoustic tones;

communicating the information received by the coupler to the first device in a form useable by the first device;

communicating information from the first device to the coupler;

generating acoustic tones at the coupler corresponding to the information received from the first device;

communicating the acoustic tones to the second device;

wherein acoustically coupling the coupler to the second device comprises:

providing a microphone coupled to the coupler for receiving the acoustic tones from the second device;

providing a speaker coupled to the coupler for transmitting the information in the form of acoustical tones from the coupler to the second device; and adjusting positions of the speaker and microphone relative to each other to vary the distance between the microphone and the speaker to facilitate coupling between the speaker and a mouthpiece of the second device and between the microphone and an earpiece of the second device; and biasing the microphone to engage the earpiece of the second device by providing a spring tending to bias the microphone away from the coupler to facilitate coupling between the microphone and the earpiece.

16. The method of claim 15 wherein adjusting positions of the speaker and the microphone comprises moving the microphone relative to the position of the speaker and the microphone comprises moving the microphone relative to the position of the speaker.

17. The method of claim 16 wherein moving the microphone relative to the speaker comprises:

supporting the microphone on an microphone carrier capable of being moved between a retracted position and an extended position within a channel on the coupler; and moving the microphone carrier to facilitate coupling between the speaker and the mouthpiece of the second device and between the microphone and the earpiece of the second device.

18. The method of claim 16 wherein moving the microphone relative to the speaker comprises:

supporting the microphone on a microphone carrier rotatably attached to the coupler; and exposing the microphone by moving the microphone carrier from a closed position to an open position to facilitate coupling between the speaker and the mouthpiece of the second device and between the microphone and the earpiece of the second device.

19. The method of claim 18 wherein the first device is a portable handheld device.

20. The method of claim 15 wherein adjusting positions of the speaker and the microphone comprises moving the speaker relative to the position of the microphone.

21. The method of claim 15 wherein the microphone is biased to sealingly engage the earpiece of the second device.

22. A system for enabling communication of information between a first device and a second device, comprising:

a coupler detachably attachable to the first device, the first device being a portable handheld device, the coupler configured to receive information from the second device in the form of acoustic tones and to communicate the information received from the second device to the first device in a form useable by the first device, and to receive information from the first device and communicate the information to the second device in the form of acoustic tones; wherein the coupler comprises a speaker for transmitting the information in the form of acoustical tones to the second device, a microphone for receiving information from the second device in the form of acoustical tones, and an adjustment mechanism for facilitating coupling between the speaker and the second device and between the microphone and the second device;

wherein the adjustment mechanism comprises a microphone adjustment mechanism for adjusting the position of the microphone relative to the position of the speaker, wherein the microphone adjustment mechanism comprises a microphone carrier supporting the microphone, the microphone carrier capable of being moved within a channel of the coupler from a retracted position to an extended position, the moving of the microphone carrier adjusting the position of the microphone relative to the speaker, wherein the microphone carrier comprises a plurality of bend points near the microphone which bends as the earpiece of the second device is pressed against the microphone carrier and biases the microphone towards the earpiece.

* * * * *